(12) United States Patent
Li et al.

(10) Patent No.: US 12,091,069 B2
(45) Date of Patent: Sep. 17, 2024

(54) SYSTEM AND METHOD FOR HYPERLOOP POD PROTECTION USING BRAKING SYSTEMS

(71) Applicant: Hyperloop Technologies, Inc., Los Angeles, CA (US)

(72) Inventors: Yanning Li, Los Angeles, CA (US); Jerome Hubert Wei, Los Angeles, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 17/794,959

(22) PCT Filed: Mar. 9, 2021

(86) PCT No.: PCT/US2021/021579
§ 371 (c)(1),
(2) Date: Jul. 23, 2022

(87) PCT Pub. No.: WO2021/194740
PCT Pub. Date: Sep. 30, 2021

(65) Prior Publication Data
US 2023/0347950 A1    Nov. 2, 2023

Related U.S. Application Data

(60) Provisional application No. 62/993,044, filed on Mar. 22, 2020.

(51) Int. Cl.
*B61L 23/34* (2006.01)
*B61H 7/08* (2006.01)
*B61L 3/16* (2006.01)

(52) U.S. Cl.
CPC .............. *B61L 23/34* (2013.01); *B61H 7/083* (2013.01); *B61L 3/16* (2013.01); *B61L 2210/04* (2013.01)

(58) Field of Classification Search
CPC ........ B61L 23/34; B61L 3/16; B61L 2210/04; B61H 7/083; B60T 2201/022; B60T 7/22
See application file for complete search history.

(56) References Cited

U.S. PATENT DOCUMENTS

| 6,189,980 | B1 * | 2/2001 | Kull ...................... B60T 13/665 303/7 |
| 2010/0132584 | A1 * | 6/2010 | Loeser .................... B60L 13/10 188/161 |

(Continued)

FOREIGN PATENT DOCUMENTS

| CN | 209351405 U | * 9/2019 | .......... B61L 15/0027 |
| CN | 209351405 U |   9/2019 | |

(Continued)

OTHER PUBLICATIONS

PCT IPEA/409 International Preliminary Report on Patentability Chapter II, PCT/US21/21579, dated Sep. 7, 2021, entire document cited.

(Continued)

*Primary Examiner* — Donald J Wallace
*Assistant Examiner* — Jalal C Coduroglu
(74) *Attorney, Agent, or Firm* — Seyfarth Shaw LLP

(57) ABSTRACT

A system and method for performing braking operations on a hyperloop pod are disclosed herein. The hyperloop pod may have a secondary braking system, wherein the secondary braking system may be operable to provide a first braking force. The hyperloop pod may have a transponder communication system and a line-of-sight system, wherein the line-of-sight system may be operable to detect a second hyperloop pod at a line-of-sight distance. The hyperloop pod may have a memory and a processor operable to detect a second hyperloop pod and determine a collision margin between the hyperloop pod and the second hyperloop pod.

(Continued)

The hyperloop pod may engage the secondary braking system if a safety margin is equal to or greater than the collision margin.

20 Claims, 12 Drawing Sheets

(56) References Cited

U.S. PATENT DOCUMENTS

| | | | |
|---|---|---|---|
| 2014/0288727 A1* | 9/2014 | Everhart | G07C 5/00 |
| | | | 701/1 |
| 2016/0075332 A1* | 3/2016 | Edo-Ros | B60W 30/0956 |
| | | | 701/70 |
| 2016/0229419 A1* | 8/2016 | Bambrogan | B63B 35/00 |
| 2018/0022405 A1* | 1/2018 | Gecchelin | B62D 47/025 |
| | | | 701/23 |
| 2020/0156605 A1* | 5/2020 | Hamm | G08G 1/166 |
| 2020/0239036 A1* | 7/2020 | Lee | B60L 13/10 |
| 2021/0086739 A1* | 3/2021 | Fischer | B61L 27/16 |
| 2021/0253137 A1* | 8/2021 | Klim | B61B 13/10 |
| 2021/0362758 A1* | 11/2021 | Bambrogan | E01F 13/12 |
| 2022/0194339 A1* | 6/2022 | Tarandek | B60T 13/145 |
| 2023/0031854 A1* | 2/2023 | Ding | B61B 13/08 |
| 2023/0161029 A1* | 5/2023 | Giddens | G01S 17/931 |
| | | | 342/54 |
| 2023/0347950 A1* | 11/2023 | Li | B61L 23/34 |

FOREIGN PATENT DOCUMENTS

| | | | |
|---|---|---|---|
| CN | 110606107 A | * | 12/2019 |
| CN | 110606107 A | | 12/2019 |
| JP | S5176720 A | | 7/1976 |
| JP | 5176720 B2 | * | 4/2013 |
| KR | 20180068818 A | | 6/2018 |

OTHER PUBLICATIONS

PCT ISA/210 International Search Report, PCT/US21/21579, dated Jul. 5, 2021, entire document cited.

PCT ISA/237 Written Opinion of International Searching Authority, PCT/US21/21579, dated Jul. 5, 2021, entire document cited.

* cited by examiner

SYSTEM AND METHOD FOR HYPERLOOP POD PROTECTION USING BRAKING SYSTEMS

CROSS REFERENCE AND PRIORITY TO RELATED APPLICATIONS

This application claims the benefit of priority to: U.S. Provisional No. 62/993,044 entitled "SYSTEM AND METHOD FOR HYPERLOOP POD PROTECTION," filed on Mar. 22, 2020, and PCT Application No. PCT/US21/21579 entitled "SYSTEM AND METHOD FOR HYPERLOOP POD PROTECTION USING BRAKING SYSTEMS," filed on Mar. 9, 2021. All the aforementioned applications are hereby incorporated by reference in their entirety.

BACKGROUND

Hyperloop is a passenger and cargo transportation system relying on a sealed tube and a bogie attached to a pod. The sealed tube has a substantially lower air pressure than the external environment. As such, the bogie and the attached pod may travel with reduced air resistance, thus increasing energy efficiency as well as performance. Further, the acceleration and the velocity of the bogie may be substantially higher than a comparable bogie operating within a gas environment with a higher pressure (including at standard air pressure of one atmosphere). Some hyperloop systems rely on magnetic levitation (sometimes referred to as "maglev"). The advantage of using maglev is a further reduction in friction viz. the resistance between a traditional wheel and a traditional track is substantially eliminated by using a maglev-based bogie. Hyperloop is in the early stages of development and commercialization. However, the projected velocity of the bogie may exceed 700 mph (1,127 kph) in commercialized implementations.

During a catastrophic failure, high velocities increase the risk of serious harm to passengers, as well as damage to property. Effective braking is critical given the higher velocity of hyperloop. Without reliable safety mechanisms, hyperloop may not attain adoption due to apprehensive passengers, stricter government regulation, higher insurance costs, increased worker costs, etc. What is needed is a system and method for hyperloop pod protection using a braking system.

SUMMARY

A first hyperloop pod is disclosed herein. The first hyperloop pod may be operable to perform a braking operation, wherein the hyperloop pod comprises a secondary braking system, further wherein the secondary braking system is operable to provide a first braking force. The first hyperloop pod may have a transponder communication system and a line-of-sight system, wherein the line-of-sight system may be operable to detect a second hyperloop pod at a line-of-sight distance. The first hyperloop pod may have a memory and a processor. The processor may be operable to detect the second hyperloop pod and determine a collision margin between the first hyperloop pod and the second hyperloop pod. The collision margin may be measured from a nose of the first hyperloop pod to a tail of the second hyperloop pod. The first hyperloop pod may engage the secondary braking system if a safety margin is equal to or greater than the collision margin.

The first hyperloop pod may perform the detection of the second hyperloop pod utilizing the line-of-sight system. The first hyperloop pod and the second hyperloop pod may be positioned on a track having a first transponder and a second transponder, wherein the first transponder and the second transponder may be separated by a first distance, wherein the first distance may be greater than a line-of-sight detection distance. The first hyperloop pod may perform the detection of the second hyperloop pod by utilizing the transponder communication system. In one aspect, the first hyperloop pod may further comprise a plurality of power electronic units, wherein the plurality of power electronic units may each have disposed therein a secondary braking system component each of which forming a plurality of secondary braking system components, wherein the plurality of secondary braking system components may be managed by the secondary braking system. The processor may be further operable to detect an offline secondary braking system component, wherein the offline secondary braking system component is part of the plurality of secondary braking system components, wherein the engaging of the secondary braking system is performed using an overdrive mode at a second plurality of secondary braking system components, wherein the second plurality of secondary braking system components may be online.

The collision margin may be increased based on a turnout operation of the second hyperloop pod. The first hyperloop pod may have a primary traction system, wherein the primary traction system may be operable to provide a first driving force, wherein the primary traction system may be further operable to provide a second braking force. The first braking force may be generated by an electromagnetic coil, wherein the electromagnetic coil is operable to generate an eddy current, further wherein the second braking force is generated by a regenerative braking system. The processor may be further operable to detect a thermal load at the secondary braking system, determine an updated collision margin, wherein the updated collision margin is based on the thermal load and the collision margin, and store the updated collision margin in the memory. The processor may be further operable to detect an emergency situation related to the first hyperloop pod and request emergency assistance via a wireless communication system.

A method for performing a braking operation at a first hyperloop pod is disclosed. The method may comprise detecting a second hyperloop pod, determining a first braking force, wherein the first braking force is provided at a secondary braking system, determining a collision margin between the first hyperloop pod and the second hyperloop pod, wherein the collision margin is measured from a nose of the first hyperloop pod to a tail of the second hyperloop pod, and engaging the secondary braking system if a safety margin is equal to or greater than the collision margin. In one aspect, the detecting of the second hyperloop pod utilizes a line-of-sight system, wherein the line-of-sight system is operable to detect the second hyperloop pod at a line-of-sight distance. In one aspect, the first hyperloop pod and the second hyperloop pod are positioned on a track having nearby a first transponder and a second transponder, wherein the first transponder and the second transponder are separated by a first distance, wherein the first distance is greater than a line-of-sight detection distance.

The method may further utilize a transponder communication system for detection of the second hyperloop pod. The method may further comprise of detecting an offline secondary braking system component, wherein the offline secondary braking system component is managed by the secondary braking system. The method may further comprise engaging the secondary braking system using an overdrive mode at a second plurality of secondary braking system components, wherein the second plurality of secondary braking system components is online. The collision margin may be increased based on a turnout operation of the second hyperloop pod. The method may further comprise providing, at a primary traction system, a first driving force and additionally providing, at the primary traction system, a second braking force. The first braking force may be generated by an electromagnetic coil, wherein the electromagnetic coil is operable to generate an eddy current, further wherein the second braking force is generated by a regenerative braking system. The method may further comprise detecting a thermal load at the secondary braking system, determining an updated collision margin, wherein the updated collision margin is based on the thermal load and the collision margin, and storing the updated collision margin in a memory. The method may further detect an emergency situation related to the first hyperloop pod and request emergency assistance via a wireless communication system.

A computer program product operable to store instructions that when executed by a computer cause the computer to perform operations substantially similar to the method disclosed herein. Further, in one aspect, a first hyperloop pod may comprise means for carrying out the operations disclosed in the method disclosed herein.

BRIEF DESCRIPTION OF DRAWINGS

The accompanying drawings, which are incorporated herein and constitute part of this specification, illustrate exemplary aspects of the claims, and together with the general description given above and the detailed description given below, serve to explain the features of the claims.

DETAILED DESCRIPTION

Figure 1:
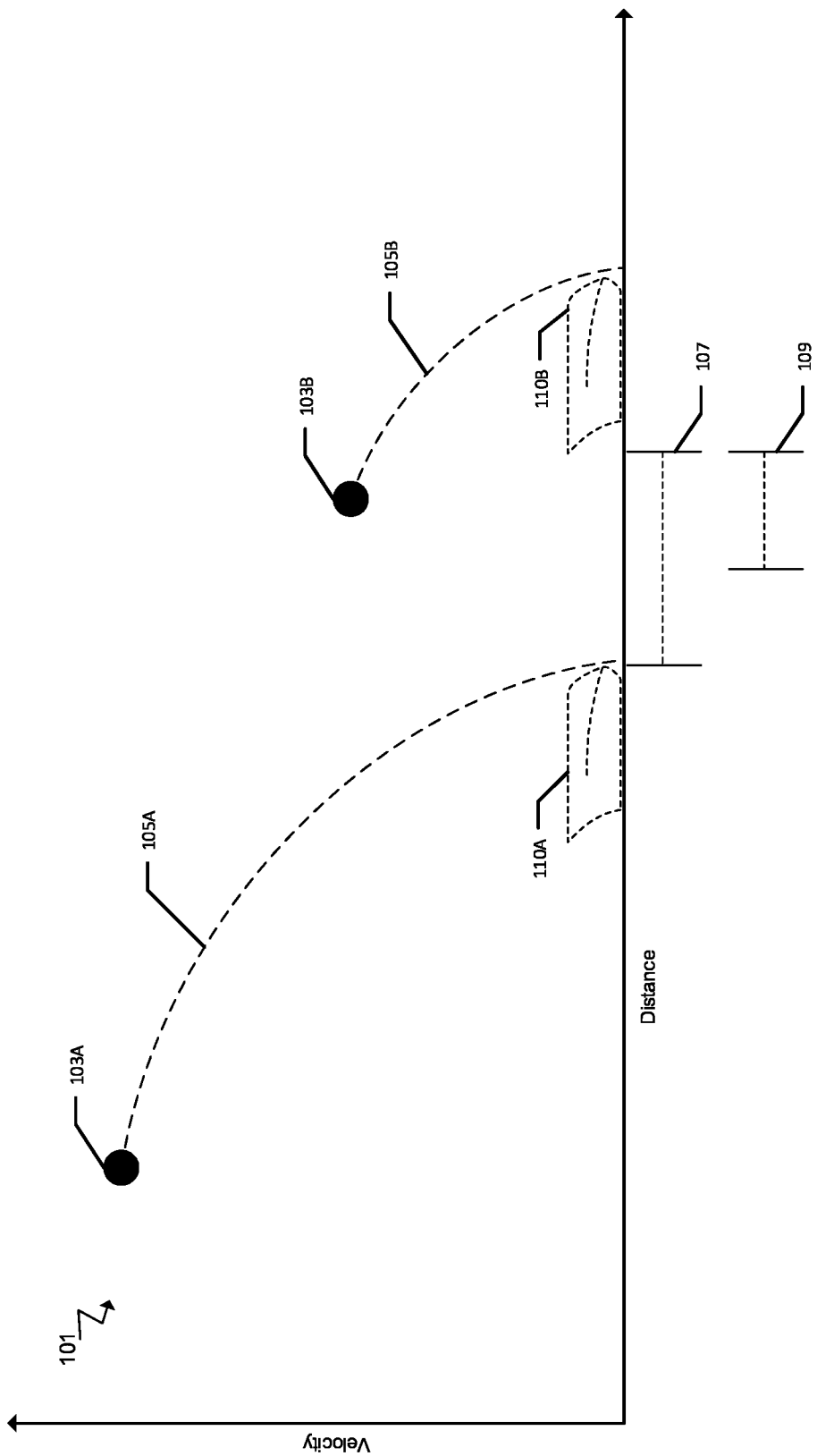
FIG. 1 is a block diagram illustrating a view of a plurality of braking curves.

Various aspects will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Maglev has physical properties that are much different than a traditional rail-based bogie having a wheel and an axle. Drag between the wheel and rail is effectively eliminated by maglev applications. Further, the near-vacuum operating environment increases efficiency by decreasing drag; however, the decrease in drag requires an increase in braking force. High velocity creates both benefits and problems that require consideration during commercialization of hyperloop.

Given the wide range of operating velocities of a hyperloop pod, not every braking technique may be appropriate for a given velocity. In a maglev environment, mechanical brakes may cause damage to track elements which cannot absorb the same mechanical friction as a traditional rail. Therefore, contactless braking is generally preferred for maglev. However, different braking techniques may have varying efficacy at different operating conditions. For example, one braking technique may be effective at high velocity and ineffective at low velocity. Likewise, another braking technique may be effective at low velocity and ineffective at high velocity. One of skill in the art will appreciate that some braking techniques may operate between the extremes.

Some braking techniques may be more acceptable to passengers within a hyperloop pod. For instance, some braking techniques may be effective at protecting a pod from severe damage; however, such braking techniques may introduce an unacceptable amount of deceleration such that passengers experience discomfort and cargo becomes damaged. Therefore, application of a braking technique is not just dependent on stopping a hyperloop pod, but rather the application of a braking technique may need to consider the contents of the hyperloop pod when performing a braking operation.

Hyperloop is in the early phases of research and commercial deployment. Safety of passengers and cargo is a generally held goal in the industry. Further, safe operation is not just necessary for protecting passengers and cargo but also for adoption of hyperloop as an alternative mode of transportation. Beyond safety, comfort for passengers is a requirement for widespread adoption, but such comfort may need to be balanced with safety considerations. Stated differently, hyperloop may need to substantially feel like other modes of travel in order to facilitate widespread adoption. For example, commercial aircraft do not require helmets and breathing apparatuses as used in military aircraft because commercial aircraft have been designed more for comfort rather than more for performance.

What is needed is a system and method for braking a hyperloop pod having a plurality of braking systems. Such a system and method may increase safety for passengers, protect cargo, increase operating efficiency, increase adoption of hyperloop, and more.

FIG. 1 is a block diagram illustrating a view 100 of a plurality of braking curves made up of a first braking curve 105A and a second braking curve 105B. The braking curves 105A, 105B are plotted against velocity on the y-axis and distance on the x-axis. A starting point 103A correlates to the first braking curve 105A. The starting point 103A denotes a high velocity at a first distance. A first hyperloop pod 110A is shown for illustrative purposes as belonging to the first braking curve 105A. As the pod 110A brakes, the velocity generally decreases while the pod 110A continues to move forward. At the intersection of the x-axis and the curve 105A, the pod 110A is halted.

Turning to the curve 105B, a starting point 103B may be located at a lower velocity than the starting point 103A. A second pod 110B is associated with the starting point 103B and the curve 105B. As the hyperloop pod 110B begins braking, the velocity decreases as distance continues to increase. At the intersection of the x-axis and the curve 105B, the hyperloop pod 110B is considered to be halted.

A collision margin 107 is denoted showing the nose of the pod 110A measured to the tail of the pod 110B. The collision margin 107 is the distance between the tail of a pod and the nose of the next upstream pod. The collision margin 107 may vary in implementation within a commercial environment. A safety margin 109 is depicted as being smaller than the collision margin 107. As shown in the instant figure, the collision margin 107 is greater than the safety margin 109. Therefore, the hyperloop pods 110A, 110B are considered to be safely operating since the hyperloop pod 110A is sufficiently distanced from the tail of the hyperloop pod 110B when the hyperloop pods 110A, 110B are in-flight or halted. In the event that the collision margin 107 is less than the safety margin 109, the risk to lives and property is considered to be increased. Further, the risk may include death of passengers and destruction of property, in extreme cases. Therefore, maintaining a collision margin greater than a safety margin is paramount to safe operation of the pods 110A, 110B.

Figure 2:
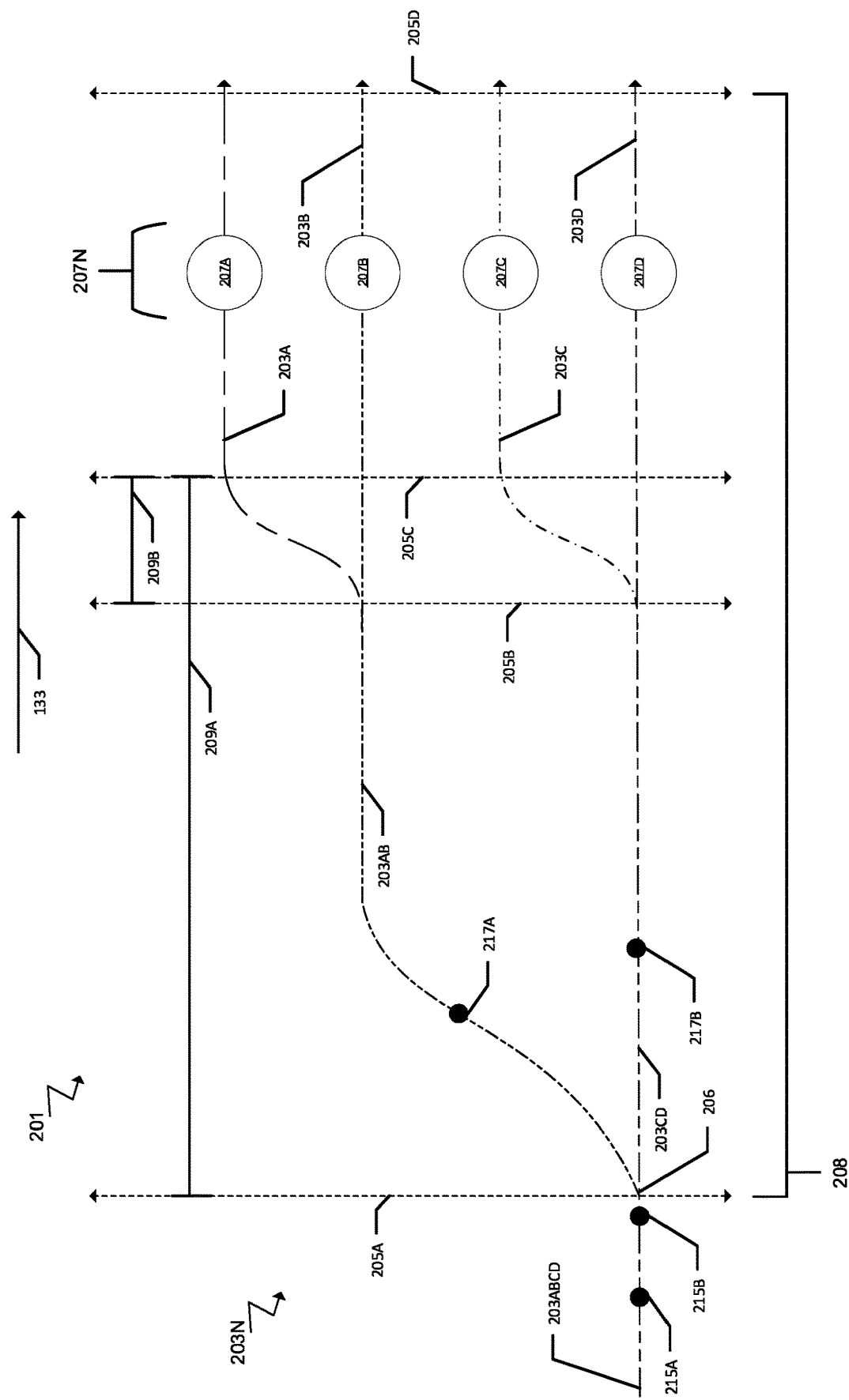
FIG. 2 is a block diagram illustrating a hyperloop network.

FIG. 2 is a block diagram illustrating a hyperloop network 201. A direction of travel 133 is denoted on the instant figure. The hyperloop network 201 is shown in the instant figure as having a plurality of routes 203N and a plurality of docking stations 207N. The plurality of routes is comprised of a first route 203ABCD, a second route 203AB, a third route 203CD, a fourth route 203A, a fifth route 203B, a sixth route 203C, and a seventh route 203D. Each of the routes 203A, 203B, 203C, 203D, 203AB, 203CD, 203ABCD are so referenced to indicate how each route is shared by each of the docking stations within the plurality of docking stations 207N. For instance, the route 203ABCD is shared by all docking stations viz. a first docking station 207A, a second docking station 207B, a third docking station 207C, and a fourth docking station 207D.

The route 203ABCD begins off the page to the left and reaches an axis 205A. The route 203AB extends from the axis 205A to an axis 205B. The route 203CD extends from the axis 205A to the axis 205B. The route 203A begins at the axis 205B and proceeds to an axis 205D. The route 203B begins at the axis 205B and proceeds to the axis 205D. The route 203C begins at the axis 205B and proceeds to the axis 205D. The route 203D begins at the axis 205B and proceeds to the axis 205D.

The docking station 207A lies on the route 203A. The docking station 207B lies on the route 203B. The docking station 207C lies on the route 203C. The docking station 207D lies on the route 207D. An axis 205C indicates the start of a near-zero-velocity zone which extends from the axis 205C to the axis 205D along the routes 203A, 203B, 203C, 203D, respectively. For instance, the route 203A, between the axis 205C and the axis 205D, may be considered to be within the near-zero-velocity zone of the route 203A.

The instant figure illustrates how a hyperloop pod (e.g., the hyperloop pod 110A) may increase the collision margin 107 by having turnouts to the plurality of docking stations 207N within a portal 208. The portal 208 may have a portal ingress 206 at the intersection of the route 203ABCD and the axis 205A. The portal 208 extends along the plurality of routes 203N from the axis 205A to the axis 205D. If the portal ingress 206 becomes congested with waiting pods, the collision margin 207 may begin to approach the safety margin 209. Such a situation may require a reduction in velocity by the hyperloop pods that are approaching the portal 208. However, as demonstrated in the instant figure, the portal ingress 206 has multiple branches along the plurality of routes 203N thus achieving the goal of increasing the collision margin 207 without sacrificing efficiency, performance, safety, etc.

For instance, a first hyperloop pod and a second hyperloop pod may be traveling along the route 203ABCD. When the first pod turns out at the axis 205A and proceeds along the route 203AB, the second pod may proceed along the route 203CD. Such separation of the routes 203AB, 203CD may increase the collision margin 107 between the two hyperloop pods. One of skill in the art will appreciate that the turnout for the routes 203A, 203C at the intersection of the axis 205B may offer a similarly increased collision margin.

An example with a four-second departure interval follows. At a point 215A, the hyperloop pod 110A is positioned. At a point 215B, the hyperloop pod 110B is positioned. As the hyperloop pods 110A, 110B approach the intersection of the portal ingress 206, the hyperloop pod 215B may proceed to take the turnout toward the route 203AB in order to arrive at the point 217B. Such a turnout operation enables the hyperloop pod 110A to proceed along the route 203CD in order to arrive at a point 217A. One of skill in the art will appreciate that the divergence of the two hyperloop pods 110A, 110B substantially eliminates a risk of the safety margin 109 exceeding the collision margin 107.

Performing turnout operations is generally handled by command-and-control software operating within the hyperloop network 201, the hyperloop pod 110A, the hyperloop pod 110B, or combination thereof. Further, turnout operations increase the collision margin 107. For illustrative purposes, the turnout speed at the intersection of the axis 205A and the route 203ABCD may be approximately 21.1 m/s which provides for approximately 109 meters for a distance 209A. The turnout speed at the intersections of the axis 205B and the routes 203AB, 203CD may be approximately 12.8 m/s which provides for approximately 34 meters for a distance 209B. The distances 209A, 209B are calculated such that emergency braking operations will be reduced or completely eliminated by utilizing turnout operations during operation of the hyperloop pods 110A, 110B.

One of skill in the art will appreciate that many configurations of routes may achieve a substantially similar result for the hyperloop network 201. Likewise, increasing the departure interval (e.g., from four seconds to ten seconds) will increase the collision margin 107. The opposite is similarly true viz. reducing the departure interval decreases the collision margin 107, thus making turnout operations more relevant to increase the collision margin 107.

Figure 3A:
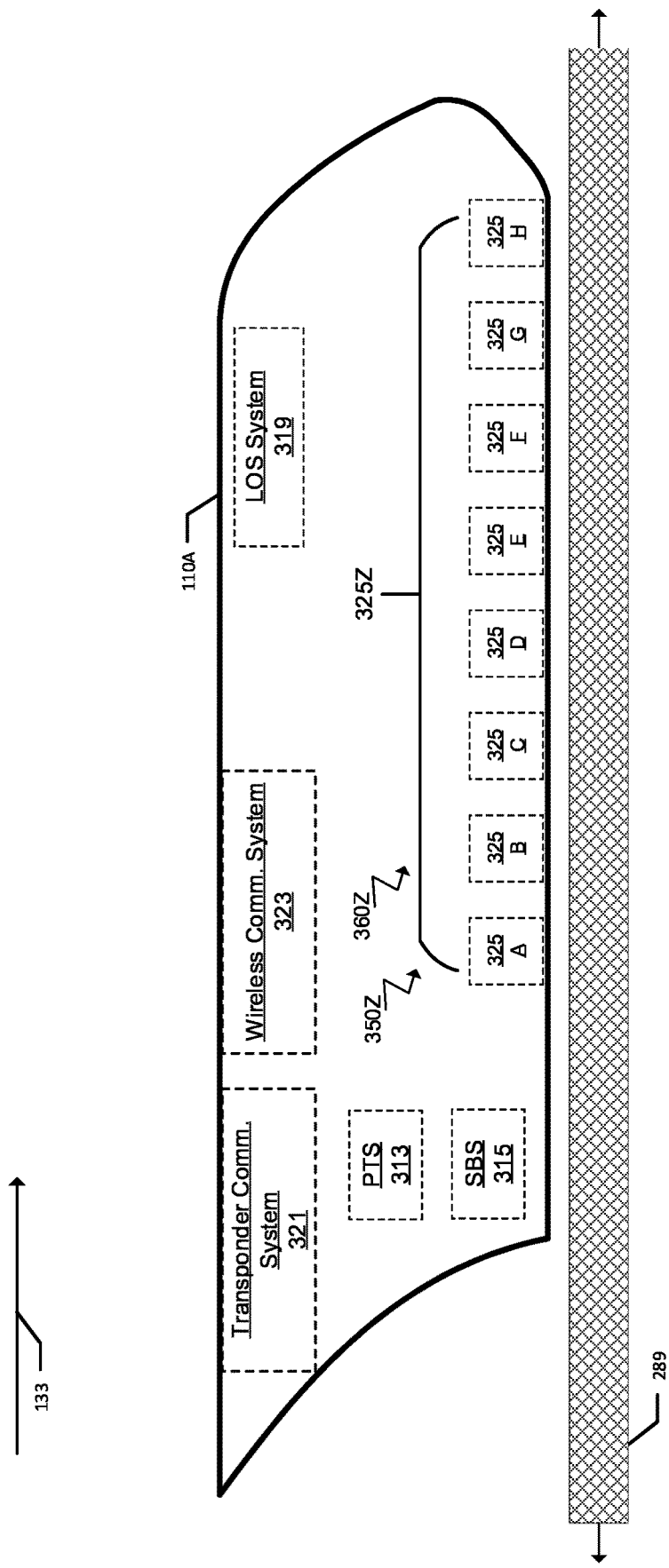
FIG. 3A is a block diagram illustrating a hyperloop pod, shown from a side perspective.

FIG. 3A is a block diagram illustrating the hyperloop pod 110A, shown from a side perspective. The hyperloop pod 110A may have a number of systems, modules, subsystems, components, etc. The terms system, module, subsystem, component, etc. may be utilized interchangeably throughout as understood by one of skill in the art. Any one of the named terms may be comprised of software, hardware, or combination thereof. The depicted instance of the hyperloop pod 110A is illustrative and not limiting since describing every aspect of the hyperloop pod 110A is beyond the scope of this disclosure.

The hyperloop pod 110A may be positioned on a track 289. The track 289 may be part of the hyperloop network 201. For instance, the track 289 may be any one of the routes 203A, 203B, 203C, 203D, 203AB, 203CD, 203ABCD. The track 289 is generally operable for maglev transportation of hyperloop pods. In general, hyperloop operates in a near-vacuum tube (not shown). One of skill in the art will appreciate that many more maglev tracks may exist for a given application of hyperloop (e.g., an overhead track assembly).

The hyperloop pod 110A may have a transponder communication system 321. The transponder communication system 321 may be operable to communicate with wayside transponders that provide real-time information to the hyperloop pod 110A when the hyperloop pod 110A is in proximity to a transponder. For instance, a transponder may provide the time, velocity, location, etc. of a downstream pod (e.g., the hyperloop pod 110B). Such information may be utilized by the hyperloop pod 110A for braking operations.

The hyperloop pod 110A may have a wireless communication system 323 that may be generally operable for wireless communication. In one aspect, the wireless communication system 323 is comprised of a wireless modem (e.g., a 5G modem) that is in communication with a cellular tower or satellite. One of skill in the art will appreciate that many regulations affect the design and operation of transportation modalities, including hyperloop. For certain operations, a transponder is required by regulation. However, some communication may be sent over wireless communication channels via the wireless communication system 323. In one aspect, WIFI connectivity may be provided to passengers within the hyperloop pod 110A via the wireless communication system 323. In another aspect, the wireless communication system 323 may be utilized to transmit emergency and diagnostic data with systems which are external to the hyperloop pod 110A. For example, if the hyperloop pod 110A is halted on the track 289 and unable to move, a diagnostic system may gather information related to the failure of the hyperloop pod 110A such that anyone from first responders to technicians may utilize the data to address the failure, rescue passengers, move the hyperloop pod, etc.

The hyperloop pod 110A may have a line-of-sight system 319. The line-of-sight system 319 may be operable to detect an object downstream from the hyperloop pod 110A. For example, the line-of-sight system 319 may be utilized to detect the hyperloop pod 110B. The line-of-sight system 319 is of particular use in the context of low-velocity movement. When the hyperloop pod 110A passes a transponder, the hyperloop pod 110A may communicate position and velocity to the transponder. When a second hyperloop pod passes by a transponder, the position and velocity information is relayed to said second hyperloop pod. However, transponder-based messaging may not provide required information if two hyperloop pods are both positioned within the same interval of transponders. Such positioning is common at low speeds, especially near portals (e.g., the portal 208). In such situations, the line-of-sight system 319 may provide detection of nearby hyperloop pods in order to maintain the proper collision margin (e.g., the collision margin 107).

The hyperloop pod 110A may have a primary traction system 313. The primary traction system 313 may be generally operable to provide propulsion and guidance to the hyperloop pod 110A. In one aspect, the primary traction system 313 may be operable to provide forward and reverse propulsion to the hyperloop pod 110A, i.e., driving force and braking force (depending on perspective). When operating in a reverse direction, the primary traction system 313 may perform regenerative braking which converts forward motion into electrical energy that may be stored in a battery for later use.

The hyperloop pod 110A may have a secondary braking system 315. The secondary braking system 315 may be generally operable to generate an eddy current in order to provide braking force. In one aspect, the secondary braking system 315 may create magnetic flux interactions with the track 289 via an electromagnetic coil. When the electromagnetic field encounters varying flux densities in the track 389, an eddy current may be generated that increases braking force between the hyperloop pod 110A and the track 289. One aspect of generating an eddy current for braking is a high jerk rate that provides for strong braking force at high velocity, which may be necessary in an emergency situation.

The hyperloop pod 110A may have a plurality of power electronic units 325Z comprising a first power electronic unit 325A, a second power electronic unit 325B, a third power electronic unit 325C, a fourth power electronic unit 325D, a fifth power electronic unit 325E, a sixth power electronic unit 325F, a seventh power electronic unit 325G, and an eighth power electronic unit 325H. Each of the power electronic units shown in the instant figure are substantially similar in kind and operation for illustrative purposes. Further, another eight power electronic units may be disposed on the opposite side of the hyperloop pod viz. the left side.

Each of the power electronic units within the plurality of power electronic units 325Z may have a primary traction system component (not shown), each of which form a plurality of primary traction system components 350Z. The plurality of primary traction system components 350Z may be controlled by the primary traction system 313. Each of the power electronic units within the plurality of power electronic units 325Z may have a secondary braking system component (not shown), each of which form a plurality of secondary braking system components 360Z. In one aspect, the secondary braking system 315 may control the plurality of secondary braking system components 360Z.

Figure 3B:
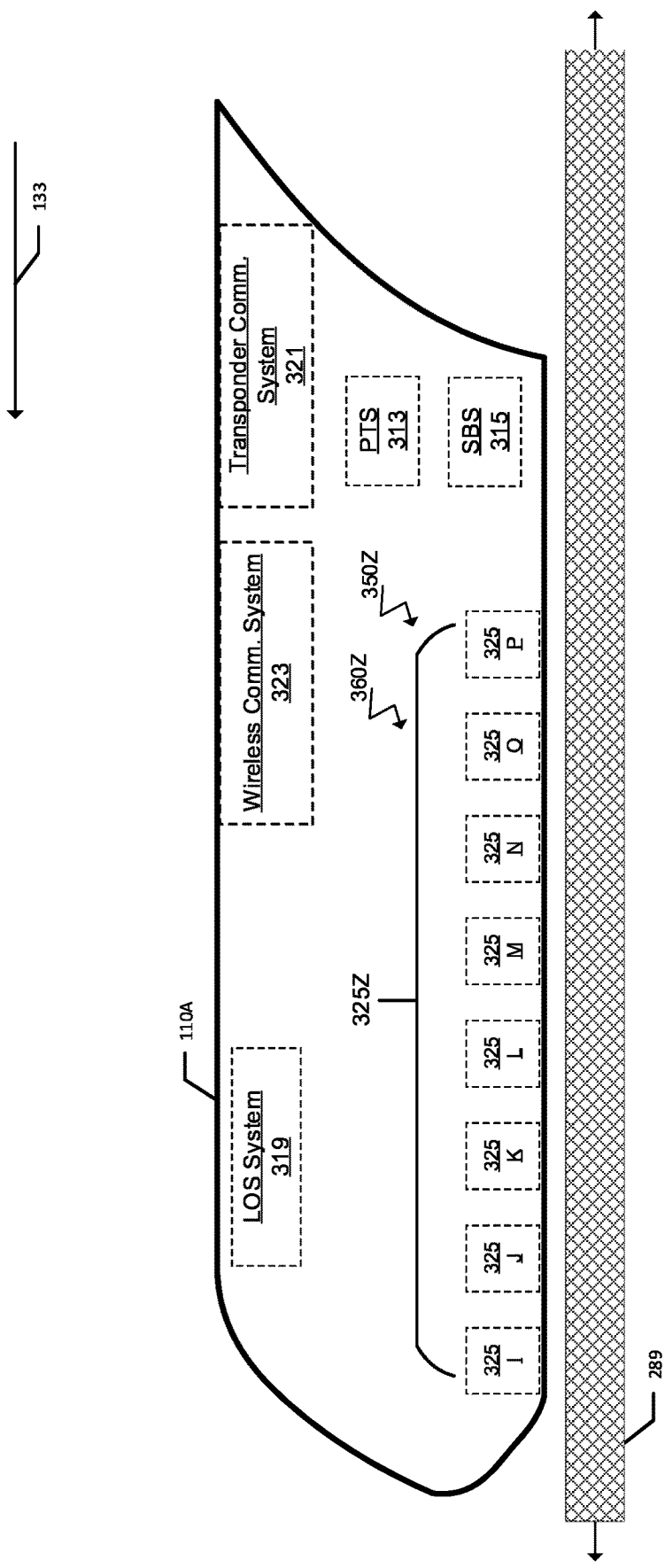
FIG. 3B is a block diagram illustrating a hyperloop pod, shown from a side perspective.

FIG. 3B is a block diagram illustrating the hyperloop pod 110A shown from a side perspective. The hyperloop pod 110A is oriented such that the left side of the hyperloop pod 110A is shown. One of skill in the art will appreciate that the direction of travel 133 has been reversed to expose the left side of the hyperloop pod 110A. As disclosed herein, the hyperloop pod 110A may have eight power electronic units on the right side of the hyperloop pod (as shown in FIG. 3A above). On the left side of the hyperloop pod 110A, the plurality of power electronic units 325Z may further comprise a ninth power electronic unit 325I, a tenth power electronic unit 325J, an eleventh power electronic unit 325K, a twelfth power electronic unit 325L, a thirteenth power electronic unit 325M, a fourteenth power electronic unit 325N, a fifteenth power electronic unit 325O, and a sixteenth power electronic unit 325P.

Figure 3C:
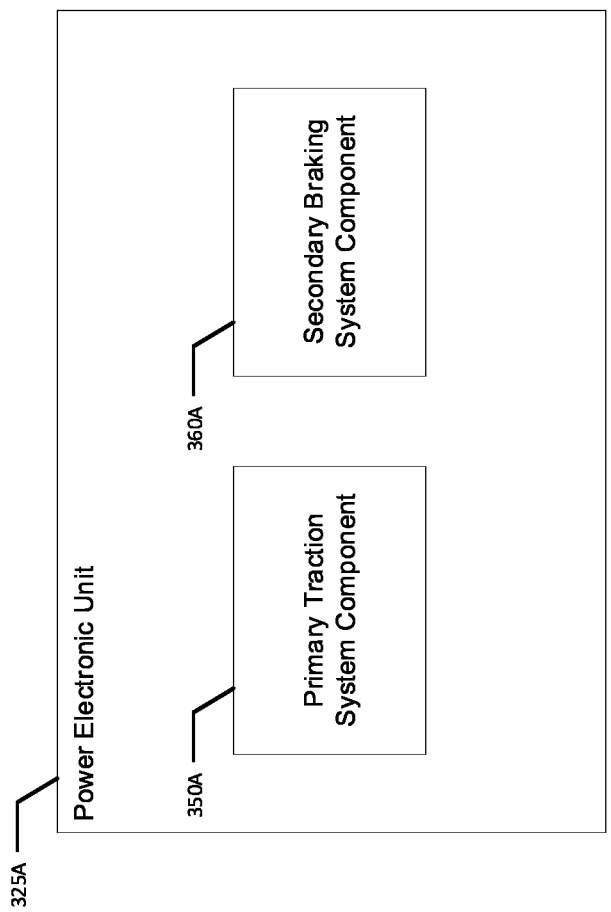
FIG. 3C is a block diagram illustrating a power electronic unit.

FIG. 3C is a block diagram illustrating the power electronic unit 325A. As shown, the power electronic unit 325A may have a primary traction system component 350A and a secondary braking system component 360A. As disclosed above, the primary traction system component 350A may be part of the plurality of primary traction system components 350Z that may be controlled by the primary traction system 313. The secondary braking system component 350A may be part of the plurality of secondary braking system components 360Z.

The primary traction system component 350A may be operable to generate electromagnetic forces that provide bidirectional movement along the track 289. Stated differently, the primary traction system component 350A may be operable to generate driving force as well as braking force. When braking, the primary traction system component 350A may be operable to capture electrical energy for storage in the batteries of the hyperloop pod. One of skill in the art will appreciate how the entire plurality of primary traction system components 350Z may be operated in concert to provide smooth driving force and braking force such that passengers and cargo are protected from excessive force.

The secondary braking system component 360A may be operable to generate an eddy current via an electromagnetic coil. The electromagnetic coil may be operable to vary the flux density within the track 289 such that an eddy current is formed between the secondary braking system component 360A and the track 289. The eddy current may be utilized for braking force.

The secondary braking system 315 may be more effective at higher velocities due to the eddy currents being generated between the plurality of secondary braking system components 360Z and the track 289. However, as the hyperloop pod 110A continues to reduce velocity, the efficacy of the secondary braking system 315 may diminish. In contrast, the primary traction system 313 may be more effective at lower velocities and less effective at higher velocities. Therefore, the combined braking profiles of the primary traction system 313 and the secondary braking system 315 may form a comprehensive braking profile that addresses the range of velocities encountered during operation.

For example, the primary traction system 313 may address velocities in the range of 0 m/s to 15 m/s. Further, the secondary braking system 313 may address the velocities from 15 m/s to 200 m/s (and further). In one aspect, the primary traction system 313 is utilized to hold the hyperloop pod 110A in place when stopped. One benefit of the secondary braking system 315 is the high jerk rate at high velocities viz. a constant −4 m/s$^3$. The high jerk rate is desirable for emergency braking operations even though passengers may experience brief discomfort. One of skill in the art will appreciate that reducing false positives for emergency braking operations may be required in commercial deployment because the high jerk rate may be disruptive to desired operation of the hyperloop network 201.

Figure 4:
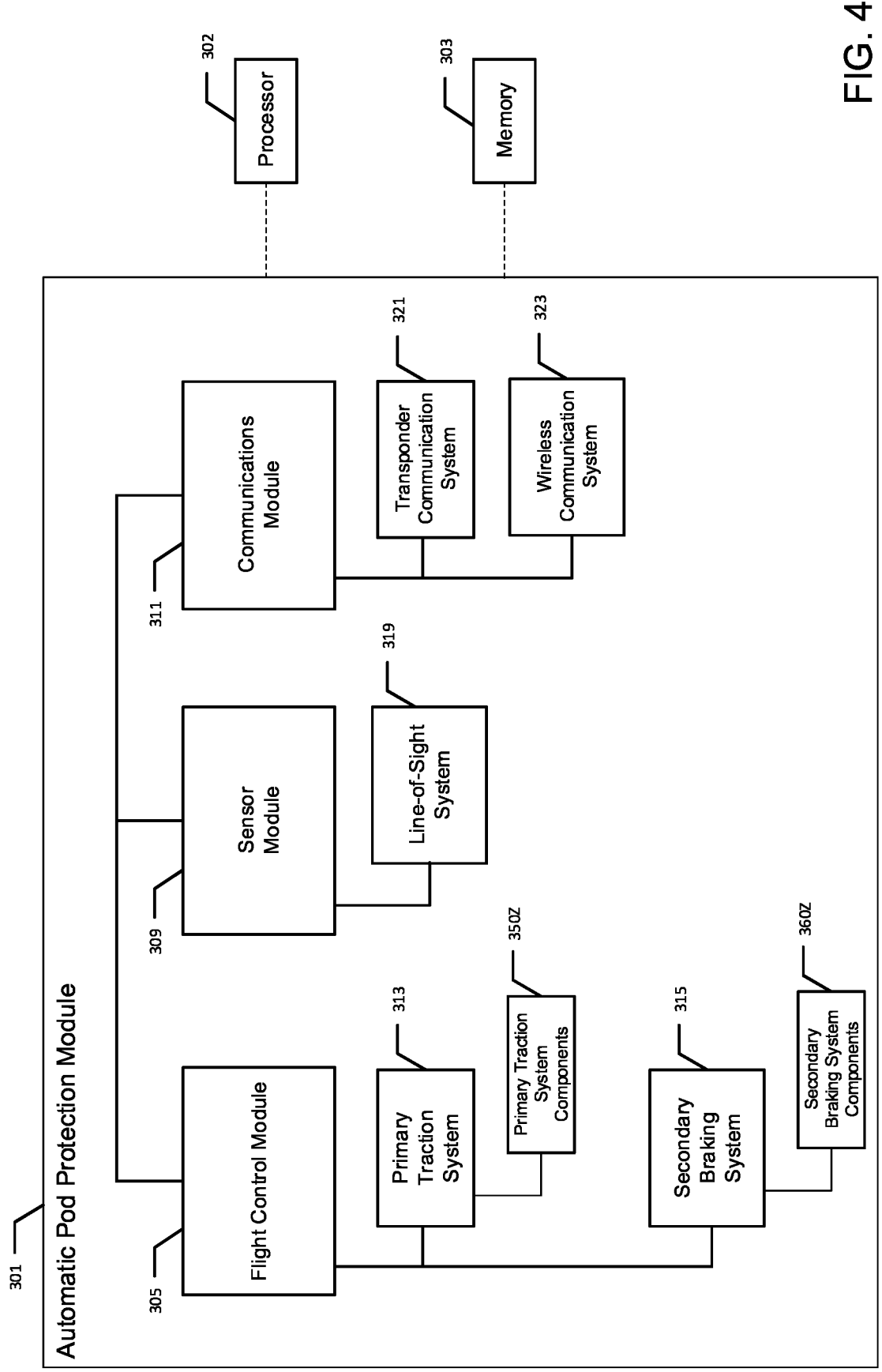
FIG. 4 is a block diagram illustrating an automatic pod protection system.

FIG. 4 is a block diagram illustrating an automatic pod protection system 301. The automatic pod protection system 301 may be generally operable to manage the systems, subsystems, components, modules, etc. of the hyperloop pods 110A. While a commercialized hyperloop pod may have hundreds of systems, the instant figure is elegant in order to highlight aspects of the automatic pod protection system 301.

The automatic pod protection system 301 may be connected to a processor 302 and a memory 303. The processor 302 may be a shared processor which is utilized by other systems, modules, etc. within the hyperloop pod 110A. For example, the processor 302 may be configured as a general-purpose processor (e.g., x86, ARM, etc.) that is configured to manage operations from many disparate systems, including the automatic pod protection system 301. In another aspect, the processor 302 may be an abstraction because any of the modules, systems, or components disclosed herein may have a local processor or controller that handles aspects of the automatic pod protection system 301.

The memory 303 is generally operable to store and retrieve information. The memory 303 may be comprised of volatile memory, non-volatile memory, or combination thereof. The memory 303 may be closely coupled to the processor 302, in one aspect. For example, the memory 303 may be a cache that is co-located with the processor 302. As with the processor 302, the memory 303 may, in one aspect, be an abstraction wherein the modules, systems, and components each have a memory that acts in concert across the automatic pod protection system 301.

The automatic pod protection system 301 may have a flight control module 305, a sensor module 309, and a communications module 311. The flight control module 305 may manage the primary traction system 313 and the secondary traction system 315. The primary traction system 313 may manage the plurality of primary traction system components 350Z, e.g., the power electronic unit 325A as shown in FIG. 3C. As disclosed above, the plurality of primary traction system components 350Z may be present within each of the power electronic units within the plurality of power electronic units 325Z. In one aspect, the primary traction system 313 may manage the power levels of the plurality of primary traction system components 350Z such that the driving force or braking force is applied evenly.

The secondary braking system 315 may manage the plurality of secondary braking system components 360Z. The secondary braking system components 360Z may be disposed throughout each of the power electronic units within the plurality of power electronic units 325Z. For example, the power electronic unit 325A may have a secondary braking system component 360A. Each of the power electronic units within the plurality of power electronic units 325Z may have a respective secondary braking system component. In one aspect, the secondary braking system 315 may manage the power levels of the plurality of secondary braking system components 360Z in order to apply braking force evenly across each of the braking system components. In another aspect, the secondary braking system 315 may manage the thermal load of the plurality of secondary braking system components 360Z. One of skill in the art will appreciate that the thermal load may be managed by any other module, system, etc. within the pod protection system 301. For example, the secondary braking system 315 may relay sensor data to the processor 302 such that the processor 302, acting in cooperation with other systems, may manage thermal load within the secondary braking system 315. Excessive thermal load may cause damage to the track 289, e.g., excessive heat may physically deform the track 289. Therefore, excessive thermal load should be avoided in general.

The flight control module 305 may manage the primary traction system 313 and the secondary braking system 315. The flight control module 305 may manage other systems that are essential to the operation of the hyperloop pod 110A while in flight. For example, the flight control module 305 may manage propulsion, guidance, track switching, etc.

The sensor module 309 may generally be related to obtaining sensor data. The obtained sensor data may be utilized by the flight control module 305 and the communications module 311. For example, the sensor module 309 may detect the current velocity of the hyperloop pod 110A and relay said current velocity to the flight control module 305. In another aspect, the communications module 311 may relay velocity information obtained by the sensor module 309 to a nearby transponder.

The sensor module 309 may have a line-of-sight system 319 that is generally operable to detect objects downstream from the hyperloop pod 110A. In one aspect, the line-of-sight system 319 may detect objects approximately 200 meters ahead of the hyperloop pod 110A. The line-of-sight system 319 may provide for detection of objects when the hyperloop pod 110A and the object are both between the same transponder interval. However, with a placement of transponders at −30 meters, the line-of-sight system 319 provides enough distance to ensure a proper collision margin.

The communications module 311 may be generally operable to manage communication between the hyperloop pod 110A and the objects outside of the hyperloop pod 110A.

The communications module 311 may have a transponder communication system 321. The transponder communication system 321 may be operable to communicate with a transponder belonging to the wayside communication network. Such transponder communication may be critical to calculating the collision margin 107. For example, as a downstream pod passes a transponder, the following pod may obtain the velocity and the position of the downstream pod as the following hyperloop pod passes the same transponder.

The communications module 311 may manage the wireless communication system 323. In one aspect, the wireless communication system 323 may be operable to communicate with a cellular communication network which covers the track 289. In another aspect, the wireless communication system 323 may be operable to communicate with a satellite system (e.g., to obtain GPS coordinates).

Figure 5A:
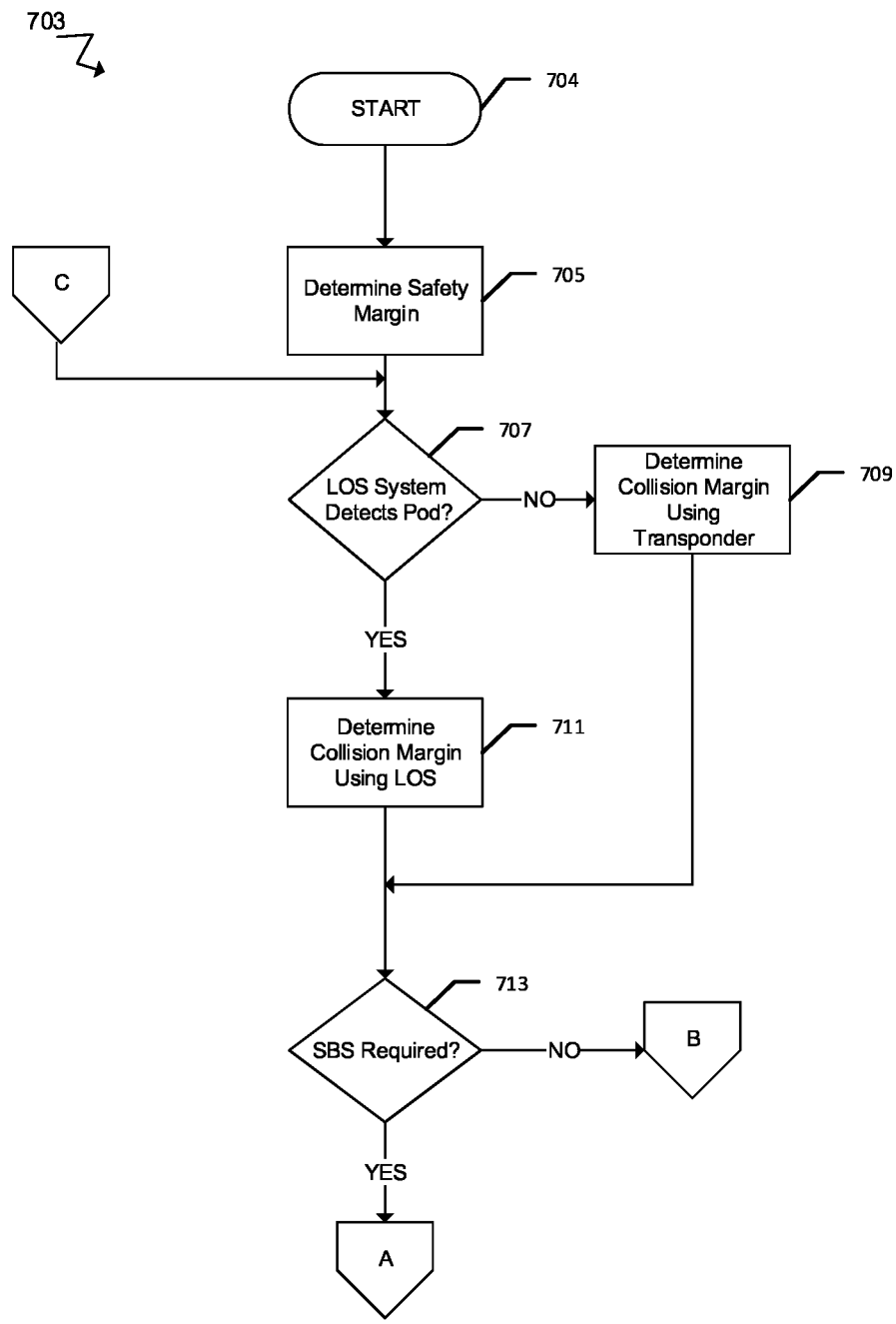
FIG. 5A is a flowchart illustrating a process.

FIG. 5A is a flowchart illustrating a process 703. The process 703 begins at the start block 704. The process 703 then proceeds to the block 705. At the block 705, the process 703 determines the safety margin 109. One of skill in the art will appreciate that the safety margin 109 may be predetermined, dynamic, or combination thereof. For example, a safety certification may require a predefined and immutable safety margin. On the other hand, a different operating environment may allow for dynamic safety margins (e.g., military applications). The process 703 then proceeds to the decision block 707.

At the decision block 707, the process 703 determines whether the line-of-sight system 319 has detected an object ahead of the hyperloop pod 110A. If the line-of-sight system 319 has not detected an object ahead, the process 703 proceeds to the block 709. At the block 709, the process 703 may determine the collision margin 107 using a transponder. In one aspect, the process 703 may utilize the transponder communication system 321 to communicate with a transponder belonging to a wayside communication network. The process 703 may utilize the functionality of the flight control module 305 to determine current power of the primary traction system 313 and the sensor module 309 to determine velocity.

Returning to the decision block 707, the process 703 may determine that the line-of-sight system 319 has detected an object ahead of the hyperloop pod 110A at which point the process 703 proceeds to the block 711. At the block 711, the process 703 may determine the collision margin 107 using the line-of-sight system 319. In one aspect, the sensor module 309 and the flight control module 305 may be utilized to perform calculations related to determining the collision margin 107.

The calculation of the collision margin 107 may be informed by traffic management operations. As described in FIG. 2 above, having various routes may provide for additional distance to increase the collision margin 107. Such traffic management solutions may operate in concert with maintaining an adequate collision margin. However, safety goals and regulations will likely require more than traffic-based collision avoidance, hence the disclosed solution addressing a long-felt need in the industry. The process 703 then proceeds to the decision block 713.

At the decision block 713, the process 703 determines whether the secondary braking system 315 is required to maintain the proper collision margin 107. The determination may be based on first measuring the current velocity via the sensor module 309. For example, if the hyperloop pod 110A is operating at low velocity, then the secondary braking system 315 may be suboptimal at said low velocity, in which case the primary traction system 313 may be more effective and thus utilized. If the secondary braking system 315 is required to maintain the proper collision margin 107, the process 703 then proceeds along the YES branch to the off-page Reference A, which corresponds to FIG. 5B. If the secondary braking system 315 is not required in order to maintain the proper collision margin 107, the process 703 proceeds along the NO branch to the off-page Reference B, which corresponds to FIG. 5C.

Figure 5B:
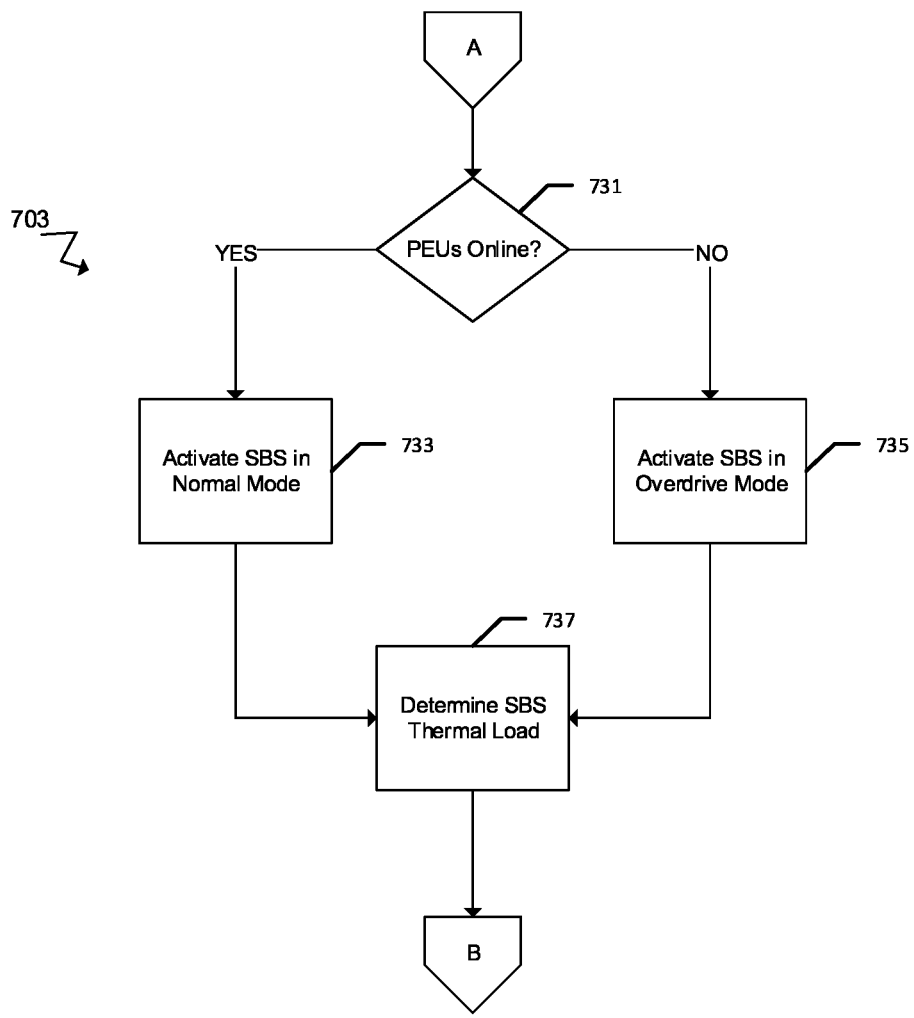
FIG. 5B is a flowchart illustrating a process.

FIG. 5B is a flowchart illustrating the process 703. The process 703 resumes from FIG. 5A at the Reference A. The process 703 proceeds to the decision block 731. At the decision block 731, the process 703 may determine whether the plurality of power electronic units 325Z are each online. One of skill in the art will appreciate that in one aspect the plurality of power electronic units 325Z may not be all power electronic units disposed on a particular hyperloop pod. For instance, the plurality of power electronic units 325Z may be a subset that is managed by the process 703.

In one aspect, the process 703 may determine that a particular power electronic unit is online, but the secondary braking system component therein may be offline. In such a situation, the process 703, at the decision block 731, may make a similar determination as that when the entire power electronic unit is offline.

In one aspect, the secondary braking system 315 may be operable to utilize an overdrive mode, in which a particular power electronic unit is run at higher power to induce more magnetic flux, thus generating a stronger eddy current. Such an overdrive mode may be advantageous when fewer than all of the plurality of power electronic units 325Z are online. For example, the power electronic unit 325E may be offline as well as the secondary braking system component 360E, housed therein. In such a situation, the process 703 may engage the secondary braking system 315 by overdriving the remaining power electronic units in order to meet the desired collision margin (e.g., the collision margin 107).

If the process 703 determines that the plurality of power electronic units 325Z are online, then the process 703 proceeds along the YES branch to the block 733. At the block 733, the process 703 activates the secondary braking system 315 according to a normal operating mode. However, one of skill in the art will appreciate that normal operating conditions still may involve an emergency aspect given the need for the secondary braking system 315 being engaged. For example, the hyperloop pod 110A may be experiencing a power failure that requires stopping and requesting assistance, whether or not the hyperloop pod 110A has in fact engaged the secondary braking system 315.

Turning back to the decision block 731, the process 703 may determine that fewer than all the plurality of power electronic units 325Z are online. The process 703 may then proceed to the block 735 at which point the secondary braking system 315 may be operated using an overdrive mode wherein the remaining power electronic units make up for the loss of one or more power electronic unit. In one aspect, the process 703 may be operable to generate enough braking force using at least two power electronic units that are still online. The process 703 then proceeds to the block 737.

At the block 737, the process 703 may determine the thermal load of the secondary braking system 315. For example, the thermal load may be such that damage may occur to the power electronic unit. Further, damage may occur to the track 289 in the event of excess heat being generated by the secondary braking system 315. If excessive thermal load is detected, the process 703 may, in one aspect, utilize the communication module 311 to relay diagnostic information or emergency information. The process 703 then proceeds to the off-page Reference B.

Figure 5C:
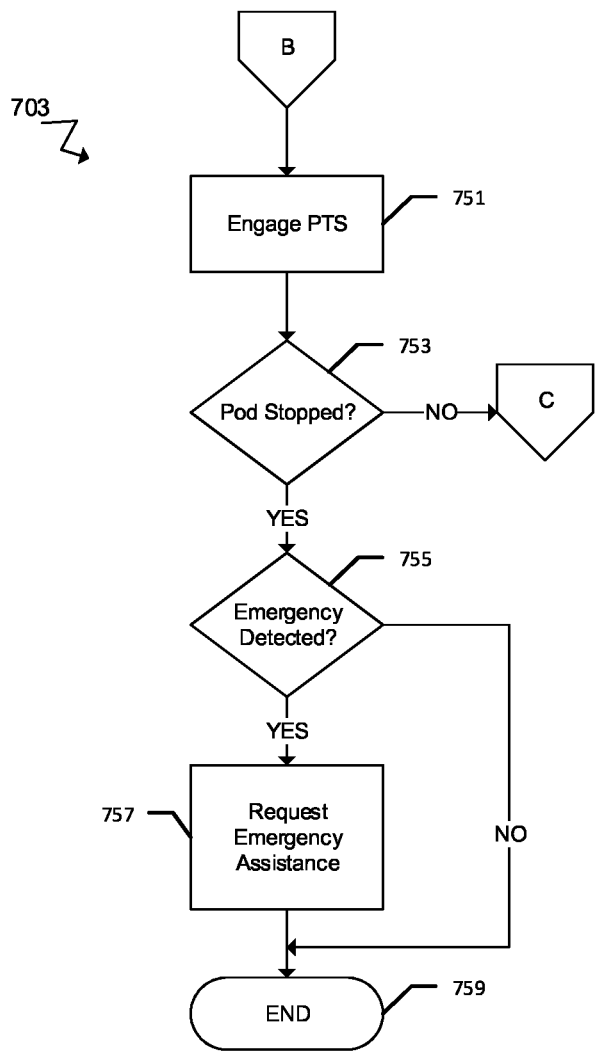
FIG. 5C is a flowchart illustrating a process.

FIG. 5C is a flowchart illustrating the process 703. The process 703 begins at the Reference B and proceeds to the block 751. At the block 751, the process 703 engages the primary traction system 313 in order to reduce velocity. The process 703 then proceeds to the decision block 753.

At the decision block 753, the process 703 may determine whether the hyperloop pod 110A is stopped. In one aspect, the sensor module 309 may be utilized to determine the current velocity. If the hyperloop pod 110A is not stopped, the process 703 proceeds to the off-page Reference C which corresponds to FIG. 5A above. If the hyperloop pod is stopped, the process 703 proceeds to the decision block 755. At the decision block 755, the process 703 may determine whether an emergency caused the process 703 to engage the secondary braking system 315. For example, the engagement of the secondary braking system 315 may be due to a minor scheduling error that merely requires correction of pod velocity and position. In contrast, engaging the secondary braking system 315 in order to stop on account of a damaged, downstream pod. If such an emergency is not detected, the process 703 proceeds along the NO branch to the end block 759 and terminates.

If an emergency situation caused the secondary braking system 315 to be engaged, the process 703 proceeds along the YES branch to the block 757. At the block 757, the process 703 may request emergency assistance. In one aspect, the process 703 may utilize the communications module 311 (e.g., the wireless communication system 323).

Figure 6A:
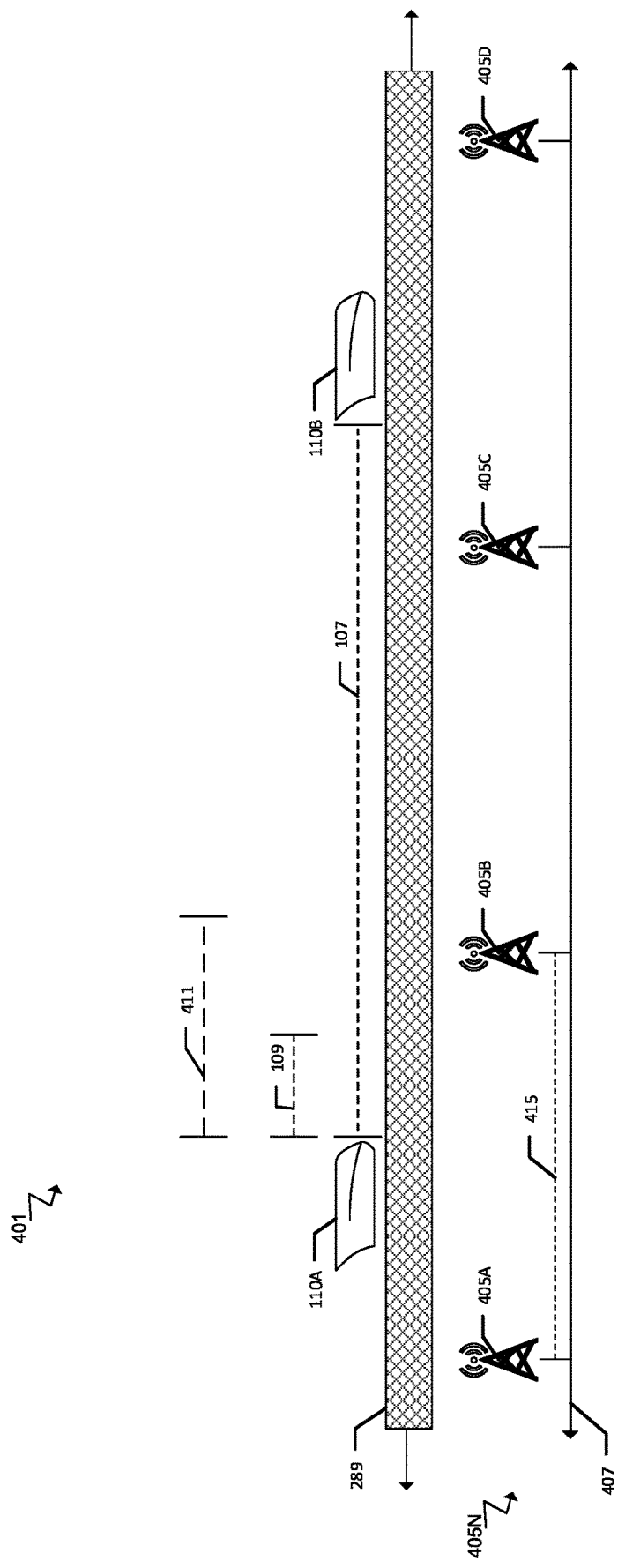
FIG. 6A is a block diagram illustrating a track having a plurality of transponders, shown from a side perspective.

FIG. 6A is a block diagram illustrating the track 289 having a plurality of transponders 405N, shown from a side perspective. The plurality of transponders 405N may be comprised of a first transponder 405A, a second transponder 405B, a third transponder 405C, and a fourth transponder 405D. The transponders 405A, 405B, 405C, 405D may be interconnected via a cable 407. A distance 415 may separate the transponder 405A from the transponder 405B. A distance may exist between each of the transponders 405A, 405B, 405C, 405D that is substantially similar to the distance 415.

As shown in the instant figure, the first hyperloop pod 110A is maintaining the collision margin 107 greater than the safety margin 109, i.e., the hyperloop pod 110A is operating in a relatively safe condition. The first hyperloop pod 110A is operating between the transponder 405A and the transponder 405B. The second hyperloop pod 110B is operating between the transponder 405C and the transponder 405D. The second hyperloop pod 110B has passed the transponder 405A as well as the transponder 405B. When the hyperloop pod 110A passes the transponders 405A, 405B, 405C, the hyperloop pod 110A may gather velocity information relating to the hyperloop pod 110B.

For example, the hyperloop pod 110B may pass the transponder 405C and relay velocity information to the transponder 405B via the cable 407. As the hyperloop pod 110A passes the transponder 405B, the velocity information may be transmitted from the transponder 405B to the hyperloop pod 110A. One of skill in the art will appreciate how a downstream hyperloop pod may communicate information to an upstream hyperloop pod via the plurality of transponders 405N. Further, one of skill in the art will appreciate that other information may be likewise communicated via the plurality of transponders 405N, including, but not limited to, position, acceleration, weight, energy storage, safety information, passenger information, maintenance information, fare information, etc.

A line-of-sight detection distance 411 is depicted. However, the line-of-sight detection distance 411 is substantially shorter than the collision margin 107, as shown in the instant figure. In one aspect, the process 700 may utilize the sensor module 309 to determine whether the line-of-sight detection system 319 or the transponder communication system 321 may be utilized. One of skill in the art will appreciate that when the collision margin 107 is shorter than the distance 415, the process 703 is likely to rely on the line-of-sight system 319.

Figure 6B:
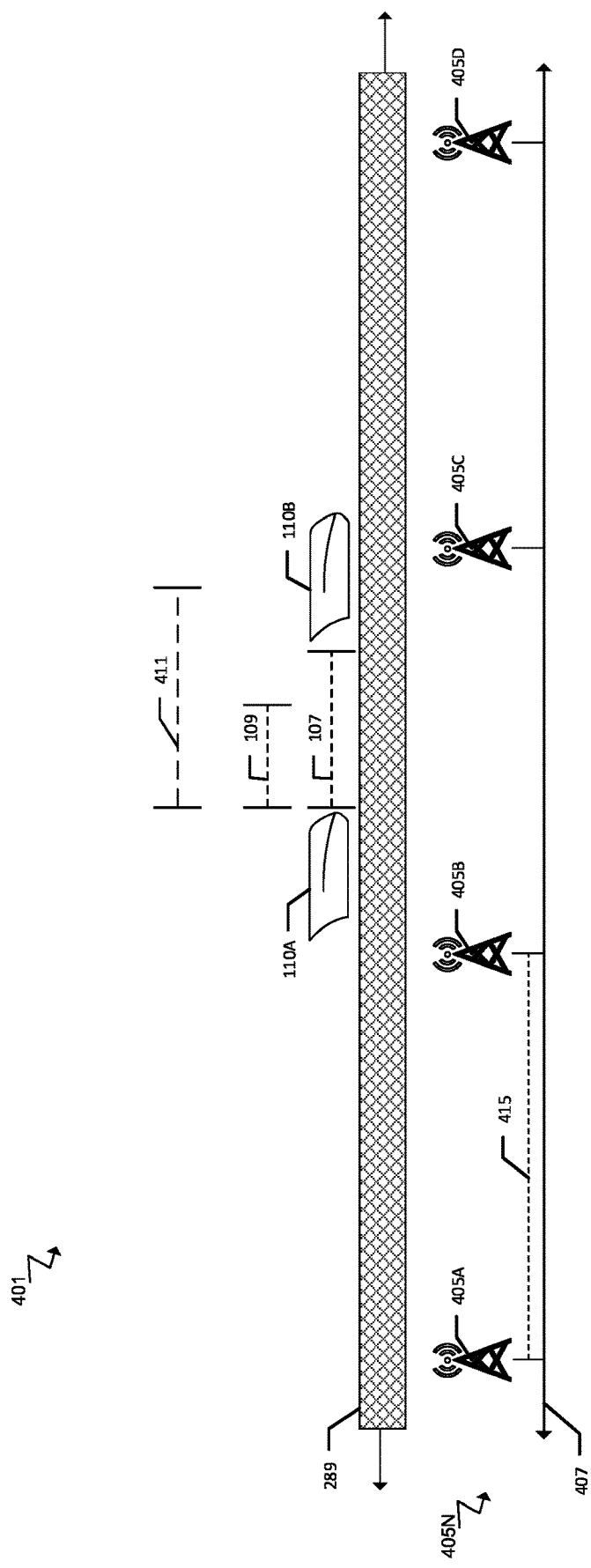
FIG. 6B is a block diagram illustrating a track having a plurality of transponders, shown from a side perspective.

FIG. 6B is a block diagram illustrating the track 289 having the plurality of transponders 405N, shown from a side perspective. As depicted, the line-of-sight detection distance 411 is such that the presence of the hyperloop pod 110B may be detected using the line-of-sight system 319. The collision margin 107 is shown as being greater than the safety margin 109. As the collision margin 107 begins to approach the safety margin 109, the process 703 may engage the primary traction system 313, the secondary braking system 315, or combination thereof.

Figure 7:
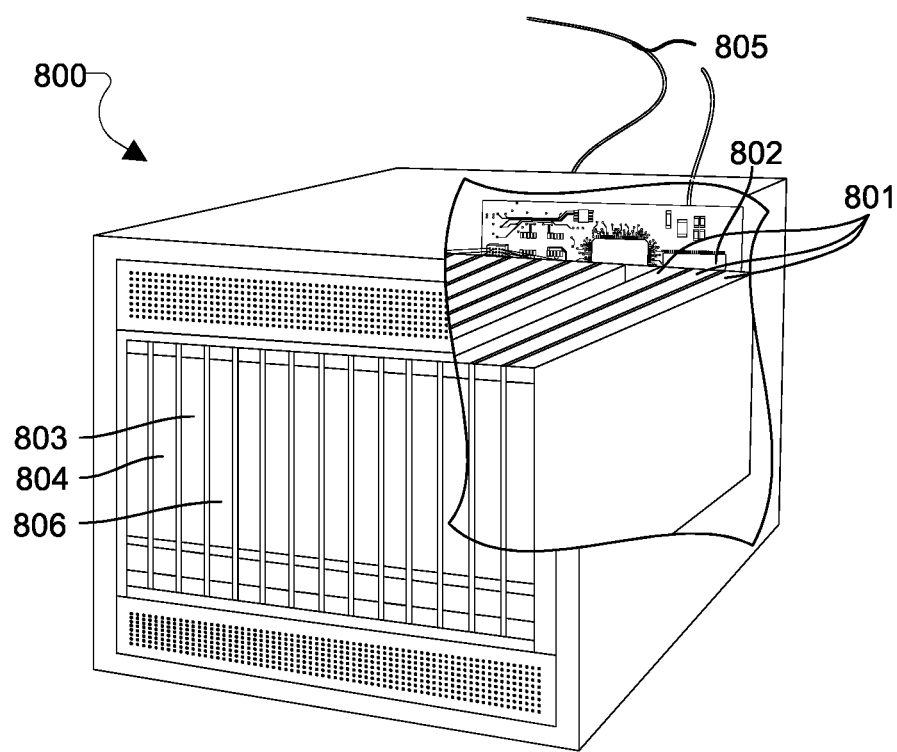
FIG. 7 is a block diagram illustrating an example server suitable for use with the various aspects described herein.

FIG. 7 is a block diagram illustrating a server 800 suitable for use with the various aspects described herein. In one aspect, the server 800 may be operable to execute the process 703. In one aspect, the server 800 may perform the functionality of the processor 302 and the memory 303 described above. Further, the server 800 may execute processes and operations related to the functionality of the automatic pod protection module 301.

The server 800 may include one or more processor assemblies 801 (e.g., an x86 processor) coupled to volatile memory 802 (e.g., DRAM) and a large capacity nonvolatile memory 804 (e.g., a magnetic disk drive, a flash disk drive, etc.). As illustrated in instant figure, processor assemblies 801 may be added to the server 800 by inserting them into the racks of the assembly. The server 800 may also include an optical drive 806 coupled to the processor 801. The server 800 may also include a network access interface 803 (e.g., an ethernet card, WIFI card, etc.) coupled to the processor assemblies 801 for establishing network interface connections with a network 805. The network 805 may be a local area network, the Internet, the public switched telephone network, and/or a cellular data network (e.g., LTE, 5G, etc.).

The foregoing method descriptions and diagrams/figures are provided merely as illustrative examples and are not intended to require or imply that the operations of various aspects must be performed in the order presented. As will be appreciated by one of skill in the art, the order of operations in the aspects described herein may be performed in any order. Words such as "thereafter," "then," "next," etc. are not intended to limit the order of the operations; such words are used to guide the reader through the description of the methods and systems described herein. Further, any reference to claim elements in the singular, for example, using the articles "a," "an," or "the" is not to be construed as limiting the element to the singular.

Various illustrative logical blocks, modules, components, circuits, and algorithm operations described in connection with the aspects described herein may be implemented as electronic hardware, computer software, or combinations of both. To clearly illustrate this interchangeability of hardware and software, various illustrative components, blocks, modules, circuits, operations, etc. have been described herein generally in terms of their functionality. Whether such functionality is implemented as hardware or software depends upon the particular application and design constraints imposed on the overall system. One of skill in the art may implement the described functionality in varying ways for each particular application, but such implementation decisions should not be interpreted as causing a departure from the scope of the claims.

The hardware used to implement various illustrative logics, logical blocks, modules, components, circuits, etc. described in connection with the aspects described herein may be implemented or performed with a general purpose processor, a digital signal processor ("DSP"), an application specific integrated circuit ("ASIC"), a field programmable gate array ("FPGA") or other programmable logic device, discrete gate logic, transistor logic, discrete hardware components, or any combination thereof designed to perform the functions described herein. A general-purpose processor may be a microprocessor, a controller, a microcontroller, a state machine, etc. A processor may also be implemented as a combination of receiver smart objects, e.g., a combination of a DSP and a microprocessor, a plurality of microprocessors, one or more microprocessors in conjunction with a DSP core, or any other such like configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions (or code) on a non-transitory computer-readable storage medium or a non-transitory processor-readable storage medium. The operations of a method or algorithm disclosed herein may be embodied in a processor-executable software module or as processor-executable instructions, both of which may reside on a non-transitory computer-readable or processor-readable storage medium. Non-transitory computer-readable or processor-readable storage media may be any storage media that may be accessed by a computer or a processor (e.g., RAM, flash, etc.). By way of example but not limitation, such non-transitory computer-readable or processor-readable storage media may include RAM, ROM, EEPROM, NAND FLASH, NOR FLASH, M-RAM, P-RAM, R-RAM, CD-ROM, DVD, magnetic disk storage, magnetic storage smart objects, or any other medium that may be used to store program code in the form of instructions or data structures and that may be accessed by a computer. Disk as used herein may refer to magnetic or non-magnetic storage operable to store instructions or code. Disc refers to any optical disc operable to store instructions or code. Combinations of any of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make, implement, or use the claims. Various modifications to these aspects will be readily apparent to those skilled in the art, and the generic principles defined herein may be applied to other aspects without departing from the scope of the claims. Thus, the present disclosure is not intended to be limited to the aspects illustrated herein but is to be accorded the widest scope consistent with the claims disclosed herein.

The invention claimed is:

1. A first hyperloop pod configured to perform a braking operation, the first hyperloop pod comprising:
    a secondary braking system, the secondary braking system being configured to provide a first braking force;
    a transponder communication system;
    a line-of-sight system, the line-of-sight system being configured to detect a second hyperloop pod at a line-of-sight distance;
    a plurality of power electronic units, the plurality of power electronic units, each having disposed therein a secondary braking system component forming a plurality of secondary braking system components, the plurality of secondary braking system components being managed by the secondary braking system;
    a memory; and
    a processor, the processor configured to:
        detect the second hyperloop pod;
        determine a collision margin between the first hyperloop pod and the second hyperloop pod, the collision margin being measured from a nose of the first hyperloop pod to a tail of the second hyperloop pod;
        engage the secondary braking system if a safety margin is equal to or greater than the collision margin; and
        detect an offline secondary braking system component, the offline secondary braking system component being part of the plurality of secondary braking system components, wherein the engaging of the secondary braking system is performed using an overdrive mode at a second plurality of secondary braking system components, the second plurality of secondary braking system components being online.

2. The first hyperloop pod of claim 1, wherein the detection of the second hyperloop pod utilizes the line-of-sight system.

3. The first hyperloop pod of claim 1, wherein the detection of the second hyperloop pod utilizes the transponder communication system.

4. The first hyperloop pod of claim 1, wherein the collision margin is increased based on detection of a turnout operation of the second hyperloop pod.

5. The first hyperloop pod of claim 1, the first hyperloop pod further comprising:
    a primary traction system, the primary traction system being configured to provide a first driving force, the primary traction system being further configured to provide a second braking force.

6. The first hyperloop pod of claim 5, wherein the first braking force is generated by an electromagnetic coil, the electromagnetic coil being configured to generate an eddy current, further wherein the second braking force is generated by a regenerative braking system.

7. The first hyperloop pod of claim 1, the processor being further configured to:
    detect a thermal load at the secondary braking system;
    determine an updated collision margin, the updated collision margin being based on the thermal load and the collision margin; and
    store the updated collision margin in the memory.

8. The first hyperloop pod of claim 1, the processor being further configured to:
    detect an emergency situation related to the first hyperloop pod; and
    request emergency assistance via a wireless communication system.

9. A method for performing a braking operation at a first hyperloop pod, the method comprising:
    engaging, at a processor, a plurality of power electronic units, the plurality of power electronic units each having disposed therein a secondary braking system component forming a plurality of secondary braking system components, the plurality of secondary braking system components being managed by a secondary braking system;

detecting, at the processor and at a first hyperloop pod, a second hyperloop pod;

determining, at the processor, a first braking force, the first braking force being provided at the secondary braking system;

determining, at the processor, a collision margin between the first hyperloop pod and the second hyperloop pod, the collision margin being measured from a nose of the first hyperloop pod to a tail of the second hyperloop pod;

engaging, at the processor, the secondary braking system if a safety margin is equal to or greater than the collision margin;

detecting, at the processor, an offline secondary braking system component, the offline secondary braking system component being managed by the secondary braking system; and engaging, at the processor, the secondary braking system using an overdrive mode at a second plurality of secondary braking system components, the second plurality of secondary braking system components being online.

10. The method of claim 9, wherein the detecting of the second hyperloop pod utilizes a line-of-sight system, the line-of-sight system being configured to detect the second hyperloop pod at a line-of-sight distance.

11. The method of claim 9, wherein the detecting of the second hyperloop pod utilizes a transponder communication system.

12. The method of claim 9, wherein the collision margin is increased based on detection of a turnout operation of the second hyperloop pod.

13. The method of claim 9, the method further comprising:
providing, at a primary traction system, a first driving force; and
providing, at the primary traction system, a second braking force.

14. The method of claim 13, wherein the first braking force is generated by an electromagnetic coil, the electromagnetic coil being configured to generate an eddy current, further wherein the second braking force is generated by a regenerative braking system.

15. The method of claim 9, the method further comprising:
detecting, at the processor, a thermal load at the secondary braking system;
determining, at the processor, an updated collision margin, the updated collision margin being based on the thermal load and the collision margin; and
storing, at the processor, the updated collision margin in a memory.

16. The method of claim 9, the method further comprising:
detecting, at the processor, an emergency situation related to the first hyperloop pod; and
requesting, at the processor, emergency assistance via a wireless communication system.

17. A computer-readable medium storing instructions that, when executed by a computer, cause the computer to:
engage, at a processor, a plurality of power electronic units, the plurality of power electronic units each having disposed therein a secondary braking system component forming a plurality of secondary braking system components, the plurality of secondary braking system components being managed by a secondary braking system;
detect, at the processor and at a first hyperloop pod, a second hyperloop pod;
determine, at the processor, a first braking force, the first braking force being provided at the secondary braking system;
determine, at the processor, a collision margin between the first hyperloop pod and the second hyperloop pod, the collision margin being measured from a nose of the first hyperloop pod to a tail of the second hyperloop pod;
engage, at the processor, the secondary braking system if a safety margin is equal to or greater than the collision margin;
detect, at the processor, an offline secondary braking system component, the offline secondary braking system component being managed by the secondary braking system; and
engage, at the processor, the secondary braking system using an overdrive mode at a second plurality of secondary braking system components, the second plurality of secondary braking system components being online.

18. The computer-readable medium of claim 17, the instructions further causing the computer to:
provide, at a primary traction system, a first driving force; and
provide, at the primary traction system, a second braking force.

19. The computer-readable medium of claim 18, wherein the first braking force is generated by an electromagnetic coil, the electromagnetic coil being configured to generate an eddy current, further wherein the second braking force is generated by a regenerative braking system.

20. The computer-readable medium of claim 17, the instructions further causing the computer to:
detect, at the processor, a thermal load at the secondary braking system;
determine, at the processor, an updated collision margin, the updated collision margin being based on the thermal load and the collision margin; and
store, at the processor, the updated collision margin in a memory.

* * * * *